(No Model.) 2 Sheets—Sheet 2.

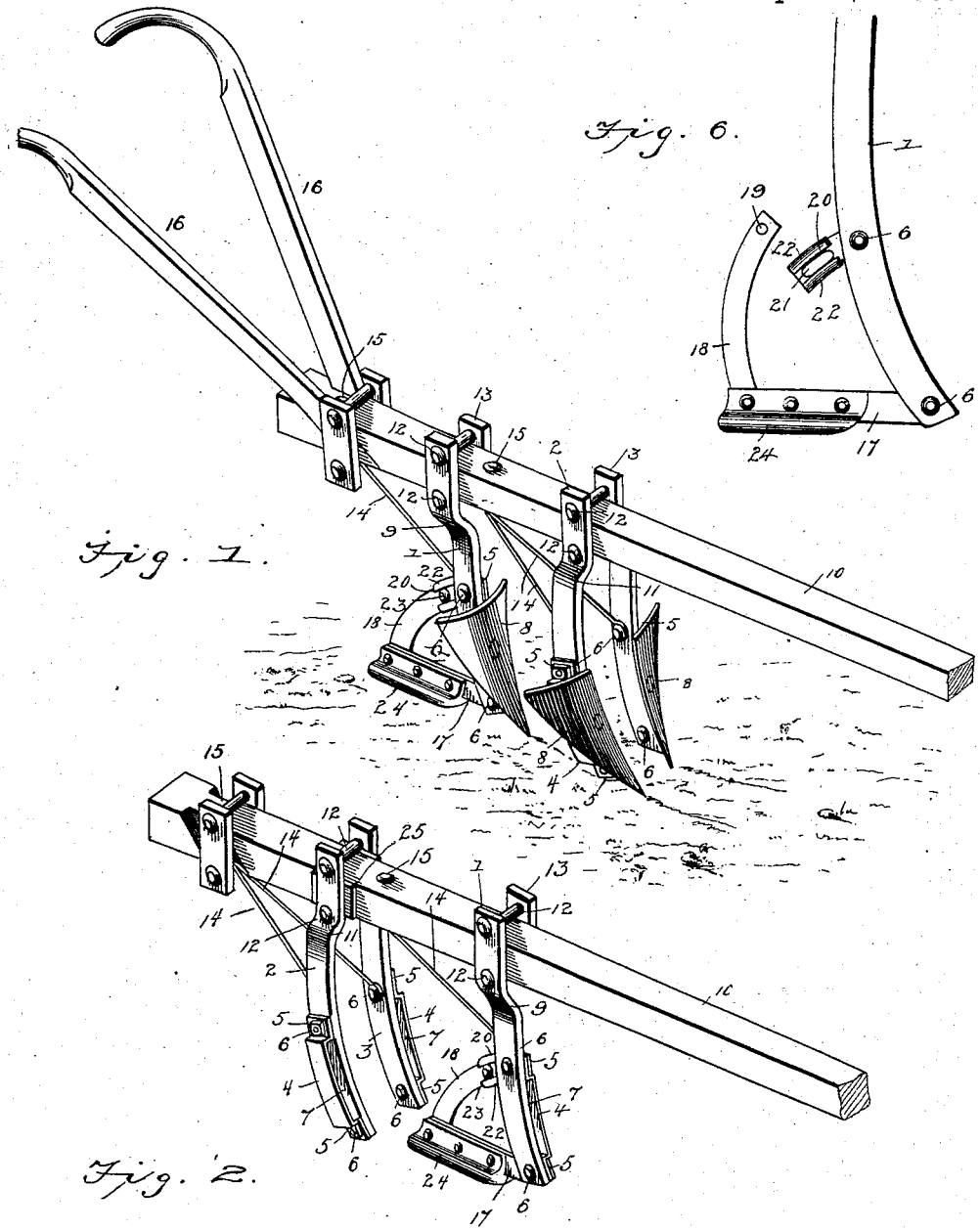

W. R. CARROLL.
PLOW.

No. 567,220. Patented Sept. 8, 1896.

Witnesses
E. H. Monroe
V. B. Hillyard.

Inventor
William R. Carroll
By his Attorneys,
C. A. Snow & Co.

UNITED STATES PATENT OFFICE.

WILLIAM R. CARROLL, OF KEATCHIE, LOUISIANA.

PLOW.

SPECIFICATION forming part of Letters Patent No. 567,220, dated September 8, 1896.

Application filed June 25, 1896. Serial No. 596,864. (No model.)

*To all whom it may concern:*

Be it known that I, WILLIAM R. CARROLL, a citizen of the United States, residing at Keatchie, in the parish of De Soto and State of Louisiana, have invented a new and useful Plow, of which the following is a specification.

This invention relates to plows and aims to provide in a single implement the elements necessary to secure a plow of required style to perform a definite work. In its organization the plow comprises a beam of ordinary form provided with handles and a series of three standards, the latter having offsets near their upper ends, so as to admit of the relationship of the standards and the points or shovels carried thereby being altered to adapt the implement to the work in hand, the main standard being provided with means for regulating the depth of furrow and the pitch of the points or shovels.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 3:
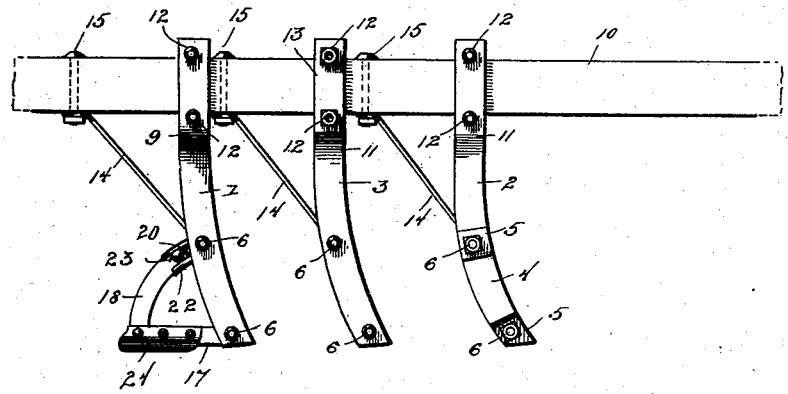
Figures 4, 7:
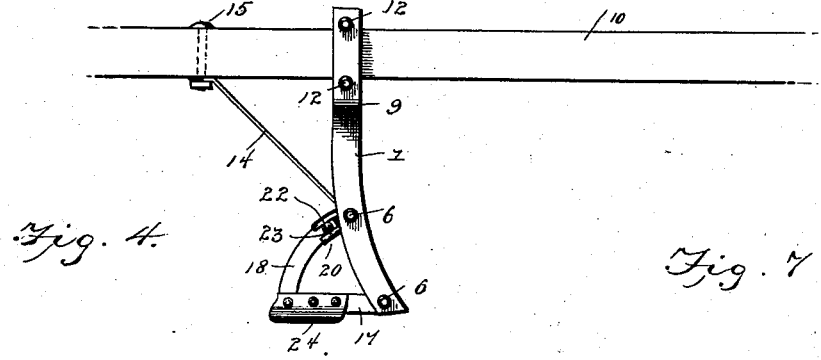
Figure 5:
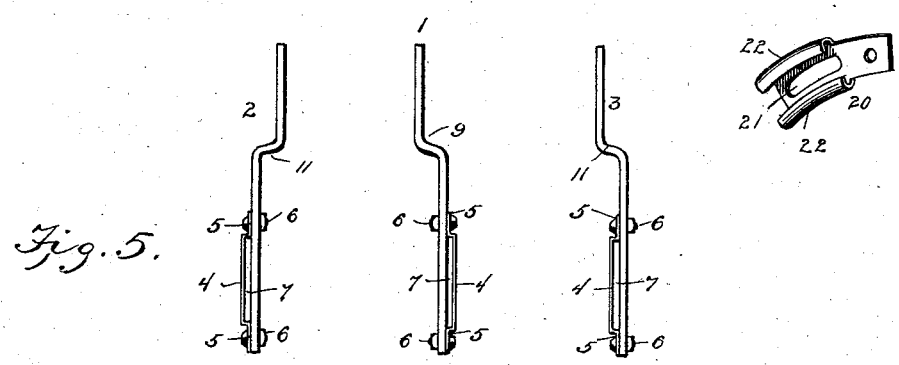

Figure 1 is a perspective view of a plow constructed in accordance with the principles of this invention. Fig. 2 is a view similar to Fig. 1, showing the standards differently arranged. Fig. 3 is a side elevation showing the standards ranged along the beam the one in advance of the other. Fig. 4 shows a plow having two of the standards omitted. Fig. 5 is a rear elevation of the three standards. Fig. 6 is a detail view of the main standard, showing the means for regulating the depth of furrow or cut. Fig. 7 is a detail view of the slotted plate having its edge portions recurved.

Corresponding and like parts are referred to in the following description and indicated in the several views of the accompanying drawings by the same reference-characters.

The three standards are represented by the numerals 1, 2, and 3, and in general appearance are similarly formed, being curved in their length and having offsets near their upper ends. Bars 4 are removably attached to the lower ends of the standards and have their end portions 5 deflected and apertured to receive the bolts 6, by means of which they are secured to the standards in the required position. By having the end portions 5 of the bars 4 deflected, as shown, slots 7 are had between the said bars and standards to receive the heel-bolts, by means of which the plow points or shovels 8 are secured to the standards. The offset 9, near the upper end of the standard 1, is sufficient to enable the upper end of the standard to extend along a side of the beam 10 and its lower portion to come about centrally below the said beam, thereby bringing the point or shovel 8, attached thereto, in vertical alinement with the middle portion of the plow-beam. The offsets 11, near the upper ends of the standards 2 and 3, are oppositely formed and of like departure, so that the lower portions may extend a like distance from the lower portion of the standard 1. Each of the standards is provided with openings near its upper end in coincident relation, and these openings are spaced apart a distance corresponding to the thickness of the beam 10, so that a bolt 12 may come above and below the plow-beam. When two standards, as 2 and 3, are placed upon opposite sides of the beam, they will be clamped against the sides of the said beam by the same fastening-bolts which pass through the registering openings therein, but when the standards are secured singly to the beam, as illustrated most clearly in Fig. 3, a short bar or plate 13 is had and is placed upon that side of the beam opposite to the standard, and the bolts 12 pass through corresponding openings in the standard and plate and clamp the parts against the sides of the beam. Each standard is strengthened by means of a brace 14, which is fastened at its lower end to the lower portion of the standard and at its upper end to the beam by means of a vertical bolt 15, the opposite ends of the braces 14 being formed with eyes to receive the bolts, by means of which they are secured to the respective parts. The handles 16 are secured to the rear end of the beam in the usual way and are for the well-known purpose.

The main standard 1 has an approximately horizontal bar 17 pivotally connected at its front end to the lower end of the standard, and a curved bar 18 has pivotal connection at its lower end with the rear end of the horizontal bar 17, and its upper end is formed with an opening 19. A plate 20 has pivotal connection at its front end with the standard 1 a short distance from its lower end and is formed with a longitudinal slot 21 and recurved edge portions 22, the latter embracing the edges of the upper portion of the curved bar 18, and forming guides to direct the latter in its movements when adjusting the horizontal bar 17 to effect a variation in the depth of furrow to be cut. A bolt 23 passes through the opening 19 and operates in the slot 21, and is the means for adjustably connecting the bar 18 and plate 20. A shoe 24 is fitted to the rear portion of the horizontal bar 17 and receives the wear incident to the trailing of the said bar upon the ground.

When it is required to turn a single furrow, the standards 2 and 3 are omitted and the standard 1, with its plow or shovel and the means for adjusting the depth of the cut, is employed solely, as illustrated in Fig. 4. If two furrows are required, the standard 1 is omitted and the standards 2 and 3 are secured to the beam, and if three furrows are required all the standards are placed in position, the standard 1 being in the lead or in the rear and the standards 2 and 3 arranged in transverse alinement or in advance of one another, as clearly indicated in the several views. The distance apart of the shovels carried by the standards 2 and 3 can be regulated by interchanging the standards, by shifting the position of the bars 4, or by interposing a block 25 between the standards and the adjacent sides of the beam, as illustrated most clearly in Fig. 2.

Having thus described the invention, what is claimed as new is—

1. In a plow, the combination with a standard, of a horizontal bar having pivotal connection at its front end with the lower portion of the standard, a curved bar having pivotal connection with the rear end of the horizontal bar, a plate having pivotal connection with the standard a short distance from its lower end and having its edge portions recurved to form guides in which operates the upper end of the aforesaid curved bar, and a bolt or like fastening for adjustably connecting the curved bar with the plate, substantially as set forth for the purpose described.

2. In a plow, the combination with the standard, of an approximately horizontal bar having pivotal connection at its front end with the lower end of the standard, a curved bar having pivotal connection at its lower end with the rear end of the horizontal bar and having an opening at its upper end, a curved plate having pivotal connection at its front end with the standard a short distance from its lower end and having the edge portions of its rear end recurved and slotted, forming a guide to receive the upper end of the aforesaid curved bar, a bolt for adjustably connecting the curved bar and plate, and a shoe applied to the rear end of the horizontal bar, substantially as set forth.

3. In an agricultural implement, the combination of a beam, a series of standards having offsets near their upper ends and adapted to be secured against the sides of the beam, bars removably attached to the lower ends of the standards and forming slots to receive the fastenings by means of which the plow points or shovels are held in place, individual braces for the standards, and means for regulating the depth of the furrow or cut, the same consisting of a horizontal bar having pivotal connection with one of the standards, a curved bar having pivotal attachment with the rear end of the horizontal bar, a curved plate having pivotal connection with the standard a short distance from its lower end and having its edge portions recurved, forming a guide to receive the upper end of the curved bar, means for adjustably connecting the curved bar and plate, and a shoe fitted to the rear portion of the aforesaid horizontal bar, substantially as and for the purpose set forth.

In testimony that I claim the foregoing as my own I have hereto affixed my signature in the presence of two witnesses.

WILLIAM R. CARROLL.

Witnesses:
J. M. WELLS,
J. I. THOMPSON.